United States Patent [19]

Lemelson et al.

[11] Patent Number: 4,632,538

[45] Date of Patent: Dec. 30, 1986

[54] VIDEO TERMINAL AND PRINTER

[76] Inventors: Jerome H. Lemelson, 85 Rector St., Metuchen, N.J. 08840; Christian Grund, 707L Eagle Heights, Madison, Wis. 53703

[21] Appl. No.: 664,529

[22] Filed: Oct. 25, 1984

[51] Int. Cl.[4] ............................................. G03G 15/00
[52] U.S. Cl. ..................................... 355/14 R; 355/11
[58] Field of Search ................. 355/3 R, 5, 7, 11, 16, 355/14 R, 14 C; 358/300

[56] References Cited

U.S. PATENT DOCUMENTS

| | | | |
|---|---|---|---|
| 3,872,462 | 3/1975 | Lemelson | 354/76 X |
| 4,167,324 | 9/1979 | Wu | 355/7 X |
| 4,320,962 | 3/1982 | Takahashi et al. | 355/8 X |
| 4,322,157 | 3/1982 | Miura et al. | 355/14 C |
| 4,340,295 | 7/1982 | Nakamura | 355/7 X |
| 4,371,898 | 2/1983 | Nakamura | 355/7 X |
| 4,378,156 | 3/1983 | Yajima | 355/7 X |

Primary Examiner—R. L. Moses

[57] ABSTRACT

A hard copy printing system for forming copy containing information from two inputs. One input employs light patterns generated by scanning documents and employed to discharge a charged xerographic photosensitive platen in a patter defined by the printing on the documents scanned. A second input employs a laser to selectively scan and discharge the platen in accordance with information displayed by a video display, such as a cathode ray tube. Means for manipulating and changing the information displayed by the video display are provided to permit the printed matter to be varied in configuration and content.

17 Claims, 4 Drawing Figures

FIG. 4

VIDEO TERMINAL AND PRINTER

BACKGROUND OF THE INVENTION

1. Field of the Invention

The invention relates to a combined printing device and an information terminal including a digital computer for generating, displaying, manipulating, transmitting and producing hard copy of data which is generated at the terminal and received from one or more memories or remote sources such as other terminals.

2. Description of the Prior Art

The prior art consists of video terminals for generating displaying and manipulating data and for printing hard copy of data displayed by the terminal display. The prior art also consists of xerographic printers of page data.

SUMMARY OF THE INVENTION

This invention relates to hard copy printing machinery and a method for generating hard copy data from a plurality of sources including from other hard copy, or in the form of signals generated by selectively operating the keys of a keyboard, from one or more memories or received data transmitted from one or more remote locations. While the machine may be connected to a terminal and keyboard for hard copy recording of data displayed at the terminal, it may also be supported in the same housing for such terminal.

It is a primary object of this invention to provide a new and improved hard copy producing arrangement and a method for communicating and recording information generated from a plurality of sources.

Another object is to provide a system for generating readable hard copy from a plurality of sources.

Another object is to provide an apparatus which may be used to generate printed copy by selectively operating keys of a coded keyboard or an electric typewriter, as well as from a plurality of other sources of data.

Another object is to provide a video communication terminal which is capable of both human selected and automatic operation for generating prints of data from keyboard operated means, from printed sheets fed thereto and also from remotely generated and transmitted information signals.

Another object is to provide an apparatus for forming composite hard copy from two or more forms of data such as data which is generated or provided from different sources thereof.

Another object is to provide a xerographic machine which is capable of producing hard copy both from reflecting image information off sheet material and from deflection controlled or otherwise configured light, such as generated by a laser wherein such light is used to expose a printing drum, such as a selenium or cadmium sulfide coated drum, to discharge charged portions thereof to form a basis for xerographic printing.

Another object is to provide a xerographic printing arrangement for printing frames or pages of information, such as multiple lines of characters, wherein a printing drum is employed which is step-driven in synchronization with the exposure of its cylindrical printing surface to each line of character generating scanning light.

Another object is to provide a xerographic printing arrangement for use in a general information terminal employing a video display wherein the displayed information may first be generated on the display and then rapidly transferred to a printing drum and printed thereby onto one or more sheets of paper.

Another object is to provide an information terminal which contains means for generating and displaying both keyboard and page data and means for selectively printing such data under the control of the operator of the terminal.

Another object is to provide a xerographic printing machine for printing page data and character data generated in a serial manner wherein a printing drum is employed which may be continuously driven during the printing of each page of data and intermittently driven when exposed to the light defining lines of serially generated characters.

Another object is to provide a video terminal having the capability of displaying and printing page information generated at the terminal, from hard copy which is scanned at the terminal or at a location remote from the terminal.

Another object is to provide a video terminal capable of printing hard copy generated by the terminal and serving as an automatic facsimile receiving and printing machine.

With the above and such other objects in view as may hereinafter more fully appear, the invention consists of the novel constructions, combinations, arrangements of parts and electronic control means as will be more fully described and illutrated in the accompanying drawings, but it is to be understood that changes, variations and modifications may be resorted to which fall within the scope of the invention as claimed without departing from the spirit and nature of the invention.

In a preferred form of the instant invention, a single housing contains a video display unit, such as a cathode ray tube or other form of video signal modulatable display for displaying video information, such as lines of alpha-numeric characters; a coded keyboard with key operated means for generating coded signals representing characters; a buffer memory for receiving signals output by such keyboard and controlling the video display to display the characters represented by the keys which are manually activated; a xerographic printing means including a transparent support for individual pages of printed matter, photographs, drawings, etc. to be printed on blank sheets of paper fed from a removable cartridge supply means insertable into an opening in said single housing; a laser with a beam which may be controlled by signals generated in response to selectively operating the keys of the keyboard which beam may be controlled to operate in synchronism with the stepped and/or continuous movement of a charged belt or drum of a xerographic printer so as to print lines of characters or generate graphs to be printed by selectively discharging the charged endless surface. Suitable controls are also provided for controlling the display device of the video display to selectively display information on its display screen with alpha-numeric character information generated by the keyboard or selectively recproduced from a local or master memory or received from a remote source, such as a remote terminal or computer. The xerographic printer may thus print what is displayed either by deflection controlling the laser with signals from the buffer, the master memory or a remote location and/or by light scanning a document disposed on the transparent support. Key switch and/or speech recognition computer controls also include a control means for effecting the superimposing of image information by selectively discharging with light selected portions of the charged surface of the drum or endless recording photosensitive belt of the printer which information is generated by the keyboard or from local or remote memory and/or light scanning the document positioned on the transparent support. The controls also include means for effecting the display of the superimposed information and cursor or otherwise generated control means for moving portions of the superimposed or single image around the display screen.

The invention may also be defined by separate housings communication with each other, one containing a computer and video display together with a keyboard for the manual generation of alpha-numeric characters on the display and effecting various manual control functions associated with the display, manipulation, call up or reproduction from memory, receipt and transmission of data to the other housing and the control of printing means therein and the transmission of digital data from the video terminal to one or more remote locations, the transmission of the data displayed on the display thereof as facsimile and/or digital data and the receipt or call up of data from one or more remote locations for display and use in controlling the printer to print such information. In other words, the single or multiple housings may be employed to perform one or more of such functions as (a) compute and generate character data, (b) compute and generate graphical data, (c) display such data, (d) display images of documents, (e) combine such displayed data in a single display or multiple displays, (f) manipulate such display data on a display screen, (g) control the reproduction of data from a memory or memories and display same, (h) transmit digital data, (i) transmit facsimile data, (j) receive, record display and print data received from one or more remote locations and (k) print either the data displayed on a video terminal or image of documents presented to a xerographic printer. While such data and document image displaying is effected by means of a charge coupled or cathode ray tube video display, the xerographic hard copy printing of such displayed or received data is effected by means of a data signal deflection and intensity controlled laser beam which may operate per se to selectively discharge the charged xerographic recording surface of a xerographic recording drum or endless belt as described which selective discharging may also be effected by conventional light reflecting off the surface of a document disposed on a scanning glass plate of the xerographic printer. Such latter document scanning may be effected prior to and/or after the xerographic drum or belt surface has been selectively discharged with character, graphics or picture information which is preferably, although not necessarily displayed on the display screen of the video terminal of the apparatus to allow the operator to monitor, inspect and manipulate the images displayed before printing is effected.

In yet another form of the invention, the image information displayed on the CCD or CRT video display may be directly scanned, such as by means of suitable fiber optic image forming means such as a fiber optic faceplate forming an optical image thereof at one surface of the faceplate while the other end of the fiber optic bundle is optically coupled to the display tube's photphor screen. The image forming face of the faceplate is disposed against or immediately adjacent the moving surface of the xerographic recording surface of the drum or endless belt to receive the light pattern formed at such fiber optic faceplate surface and to be discharged thereby as the xerographic recording surface is driven past the faceplate.

Thus composite images may be formed, displayed and printed on one or more sheets of paper or transmitted in digital and/or analog or facsimile form by electronic image signal generating and transmission per se together with reflection scanning of documents to selectively discharge xerographic recording surface means or a combination of electronic means for displaying and controlling a laser to cause its beam to selectively discharge the xerographic recording surface together with such reflection light scanning of documents. For each of these embodiments of the invention, each of the xerographic recording surface discharging means, (a) light derived from the face of the image tube or video display screen, (b) light derived from reflections of a line source of such light off a document and (c) light derived from a deflection controlled laser beam, may be employed per se or in combination with light patterns generated by the other means.

DESCRIPTION OF THE PREFERRED EMBODIMENTS

Figures 1, 2:
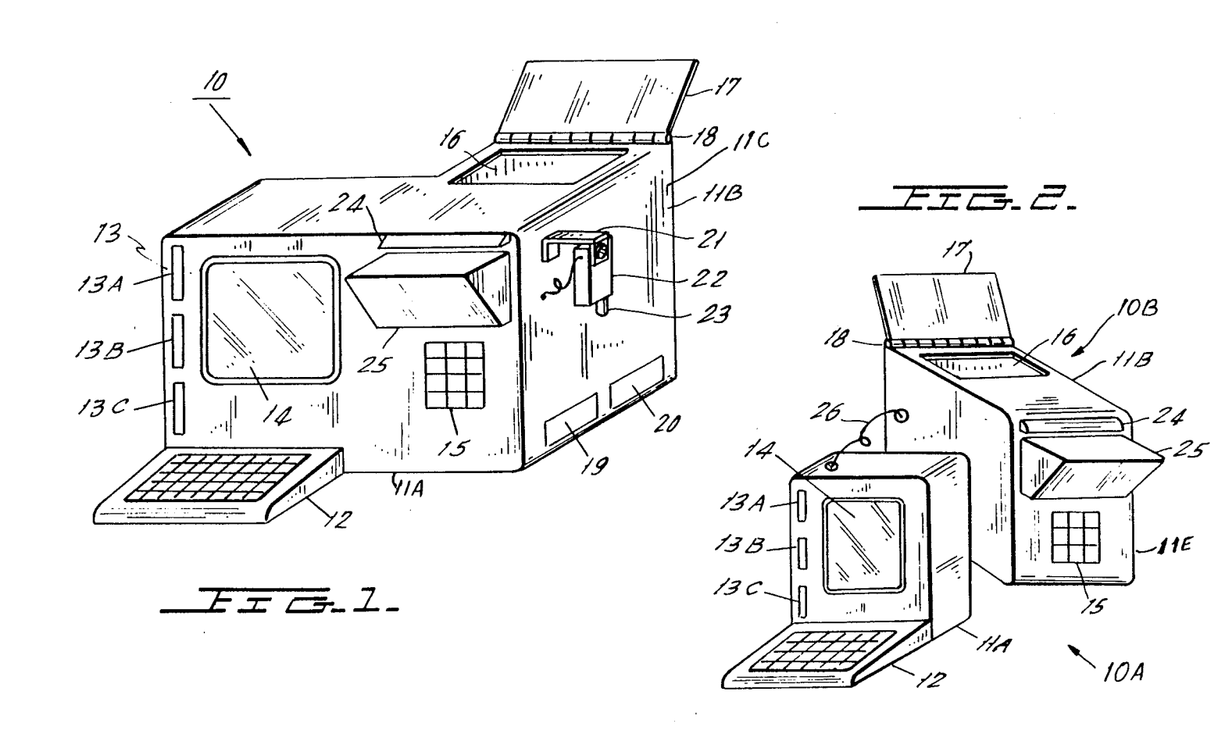
FIG. 1 shows a computer work station 10 which includes within a single housing the printing and reproduction apparatus of this invention.
FIG. 2 shows the same device as depicted in FIG. 1, but which has been separated into two independent units, one for video display and the other for copying.

In FIG. 1 is shown a computer work station 10 defined by a housing 11 supporting and containing various controls, displays and a printing means. A manually operable keyboard 12 is shown attached to the front wall 11A of the housing 11 although it may be disposed a distance therefrom on a desk top or table and electrically connected to various computing circuits in the housing 11 as illustrated, for example, in FIG. 2. Notation 13 refers to a storage portion of the housing 11 containing means for receiving and retaining a plurality of magnetic disc drives denoted 13A, 13B and 13C, each of which is operable to receive through a slotted portion of the wall 11A, respective of a plurality of magnetic record discs inserted through such openings to be operatively driven and transduced on or from.

A graphics display monitor 14 in the form of a cathode ray tube, liquid crystal or light emitting diode display screen, is supported by the front wall 11A directly in alignment with the keyboard 12 at one side of the housing 11. A panel of electrically operated indicators 15 is supported across an opening of the front wall 11A or mounted thereon. A transparent document receiving and supporting table 16, including a glass plate 16P, adapted to receive sheets of paper, such as documents and the like, to be copied in a convenient manner when disposed thereon is disposed across an opening in the upper wall of an extension 11B of the housing 11. A pivotted cover 17 is secured by a hinge 18 to one end of the extension 11B of the housing 11 and is adapted to cover a document and force same against the glass plate 16P to effect proper document scanning and reproduction when the xerographic printing means supported within housing extension 11B is properly operated. Notations 19 and 20 refer respectively to either two trays of different size paper or a single paper tray receptacle and a receptacle for printing toner. A bracket 21 is supported by the side wall 11C of the housing 11 and pivotally supports a television camera 22 having an output adjustable focusing lens 23 adapted to scan and generate video images of documents located on the table or bench top adjacent the side wall 11C or a receptacle shelf [not shown] supported by the side wall 11C and extending horizontally outwardly therefrom. Notation 24 refers to a guide for pages of sheets of paper which have been xerographically printed on within the housing 11 and a catch tray 25 or shelf for receiving and retaining such documents. An automatic sheet paper feeder may also be secured to the housing 11 to feed individual sheets of paper, such as respective documents or pages of information, to and from the document table 16 to permit such documents to be automatically printed.

In FIG. 2, two housings 11D and 11E make up the graphics and information terminal 10A which is equivalent in function to that illustrated in FIG. 1. A xerographic printer assembly 10B is provided in its own housing 11E separate from a second housing 11D containing the described keyboard 2, video monitor 14 and suitable electronic computing and control circuits for performing the functions to be described in response to the selective operation of the keys of the keyboard and other control means to be described. A flexible cable 26 is plugably connected to connectors secured to both housings 11D and 11E for communicating information generated by the selective operation of the keys 12K of the keyboard 12 to motors and control means located within housing 11E.

Figure 3:
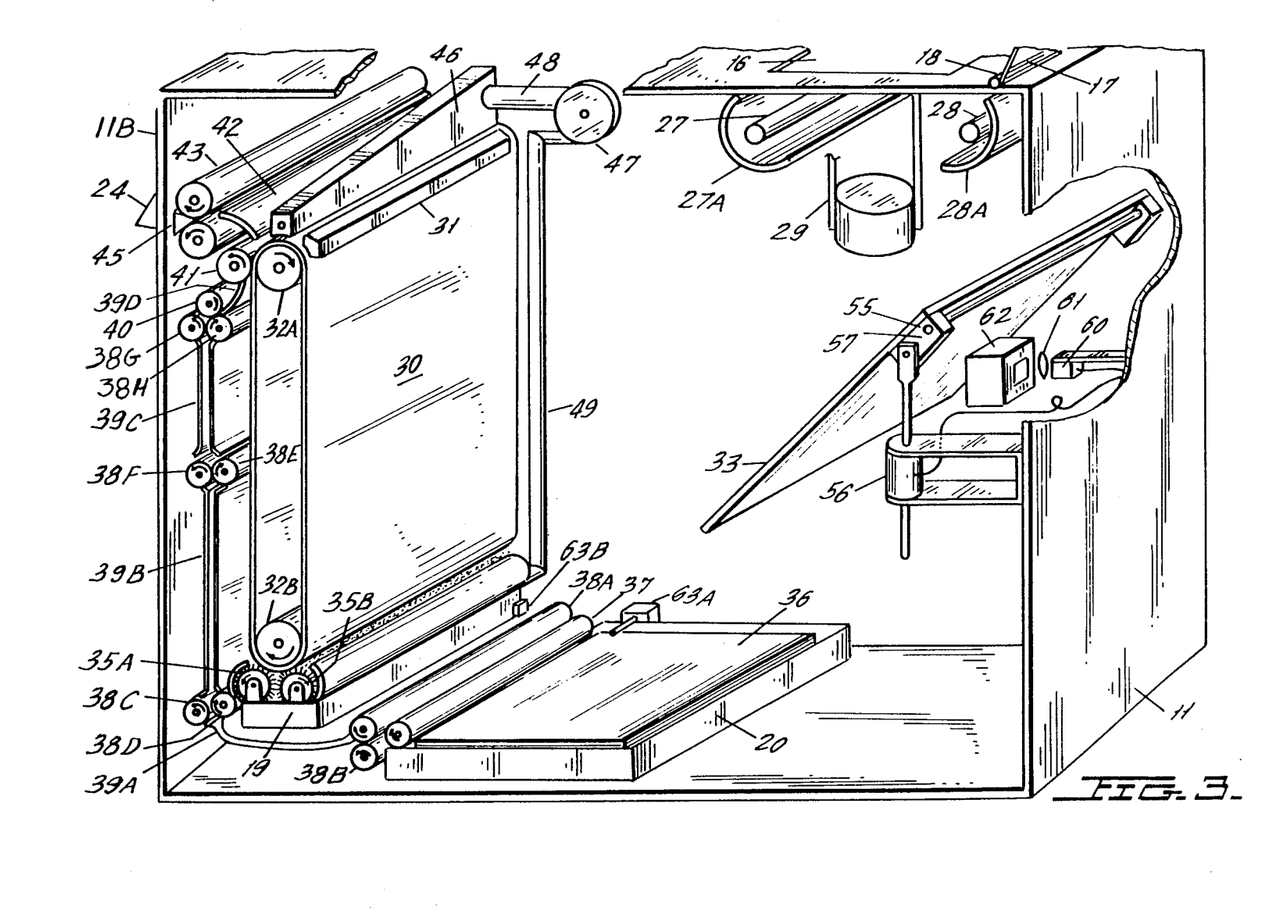
FIG. 3 shows the physical arrangement of the copying apparatus and means for projecting light onto the continuous belt.

In FIG. 3 is shown details of optical and xerographic printing components of a page or sheet printing device located either within the extension 11B of housing 11 of the terminal 10 of FIG. 1 or the printer housing 11E of FIG. 2. Certain details of the printing paper guide and drive means are not shown, for clarity, and may be provided in accordance with structures well known in the art for driving and guiding paper along a selected path or paths as described. The arrowhead notations are employed to indicate the rotational direction of certain of the rollers and brushes illustrated in FIG. 3.

In a first mode of operation involving the use of the printing apparatus in housing 11 for copying documents disposed across the opening 16 in the top wall of housing 11, elongated light sources or lamps 27 and 28 are supported parallel to each other within the housing and provide suitable document illumination by means of respective reflectors 27A and 28A which receive and properly direct the illumination from the lamps against the document as printing proceeds. The image of the illuminated document is focused by a lens 29 onto a flexible belt 30, such as a sheet of stainless steel or other suitable material coated with a suitable photoconductor, such as selenium or cadmium sulfide or other conducting material. In preparing the belt to receive and temporarily record image information to be printed, such belt 30 is driven adjacent a Corona discharge electrode 31 by the motorized rotation of belt support and drive rollers 32A and 32B. Such discharge forms a layer of positive charges in the photoconductor coating on the belt 30. When the charged belt 30 is exposed to illumination reflected off the document, white or bright light areas in the image field cause the photoconducted surface of the belt to selectively become discharged. After an appropriate exposure time, lamps 27 and 28 are automatically turned off and belt 30 is controllably driven or advanced by the rotation of rollers 32A and 32B. Charged and discharged areas of the belt 30 attract and repel negatively charged particles of printing material supplied to the belt 30 from a reservoir or tray 19 by means of conventional magnetic brushes 35A and 35B. Those areas of the belt containing positive charging, attract the dark colored or black particles of toner.

Simultaneously as the belt 30 is driven and selectively discharged, a sheet of paper 36 is automatically withdrawn from paper supply tray 20 by a paper feed roller 37 and is fed therefrom between rollers 38A and 38B which feed the paper through a paper guide 39A between respective rollers 38C and 38D, which, in turn feed such paper 36 to rollers 38E and 38F through a guide 39B, which latter guide feeds the paper sheet through a third guide 39C to drive rollers 38G and 38H. As the paper sheet 36 exits rollers 38G and 38H, it is fed into guide 39D by roller 40. Guide 39D brings the paper 36 into contact with the toner-formed document image of the belt 30. The paper is pressed into firm contact with the image generating material on the belt 30 by a roller 41. As the paper sheet exits roller 41, it encounters paper guide 42 and thereby is deflected onto a pair of hot rollers 43 and 44. Heat and pressure between these latter rollers, permanently bonds the toner to one side of the paper sheet 36. Sheet 36 exits housing 11 through a slotted opening 45 in the front wall 11B of housing 11 and is deflected downwardly by guide 24 into a receptacle or catch tray 25, illustrated in FIGS. 1 and 2.

To complete the copy cycle, belt 30 is driven beneath a vacuum hood 46 which contains a rotating brush, not shown, but located within such hood. A high volume vacuum pump 47 draws air through hood 46 and an inlet pipe 48. The combined action of the brush located within housing 46 against belt 30 and the vacuum or suction generated within the vacuum hood 46, serves to clean the surface of the belt 30 of residual toner particles. The scavenged toner particles are then returned to the toner tray 19 by a return pipe 49.

When it is desired to effect printing of computer generated images, lamps 27 and 28 are extinguished or not activated and a mirror 33 is rotated to a horizontal position about a horizontal axis defined by a shaft 55, the ends of which are supported by the side walls of housing 11. A solenoid 56, which is supported on a bracket 56B extending to a wall of housing 11, serves to affect such pivotting drive of the mirror 33 about its axis, when activated. Notation 57 refers to brackets disposed at each side of the mirror 33 for pivotally supporting the mirror on the shaft 55 and the output shaft of the solenoid 56.

When the mirror is so pivotted and the light path is so cleared, picture or image representing electrical signals are generated from a buffer or memory and are used to amplitude modulate a solid state laser 60, wherein the output of the laser, a beam of coherent radiation is passed through a collimating lens 61 supported by a bracket extending from a side wall of the housing 11. The modulated laser beam is made to scan the entire image area, preferably in a raster type of scanning motion, by the automatic operation of a scanning mechanism 62 which may comprise a pair of KDP cyrstals, which crystals electro-optically bend the path of the beam in accordance with the application of scanning signals thereto. Such scanning mechanism is known in the art as are other forms of mechanical scanning systems utilizing power rotated mirrors and prisms. The projected, raster scan and image information modulated laser beam is directed against the photoconducting material coating the moving belt 30 as described above, to selectively discharge portions of the belt and develop a suitable image charge pattern therein to properly attract printing particles and effect the printing of image information on the sheet of paper fed to the belt, as described, from the particles selectively disposed against the surface of the belt.

Also illustrated in FIG. 3 is a sensor 63A for sensing when the paper in the supply tray has run out. A second sensor 63B, determines when the supply of toner in its reservoir is low or the reservoir is substantially out of such toner. Additional sensors may also be utilized to effect suitable automatic control and indication of the operation of the xerographic printing mechanism.

Figure 4:
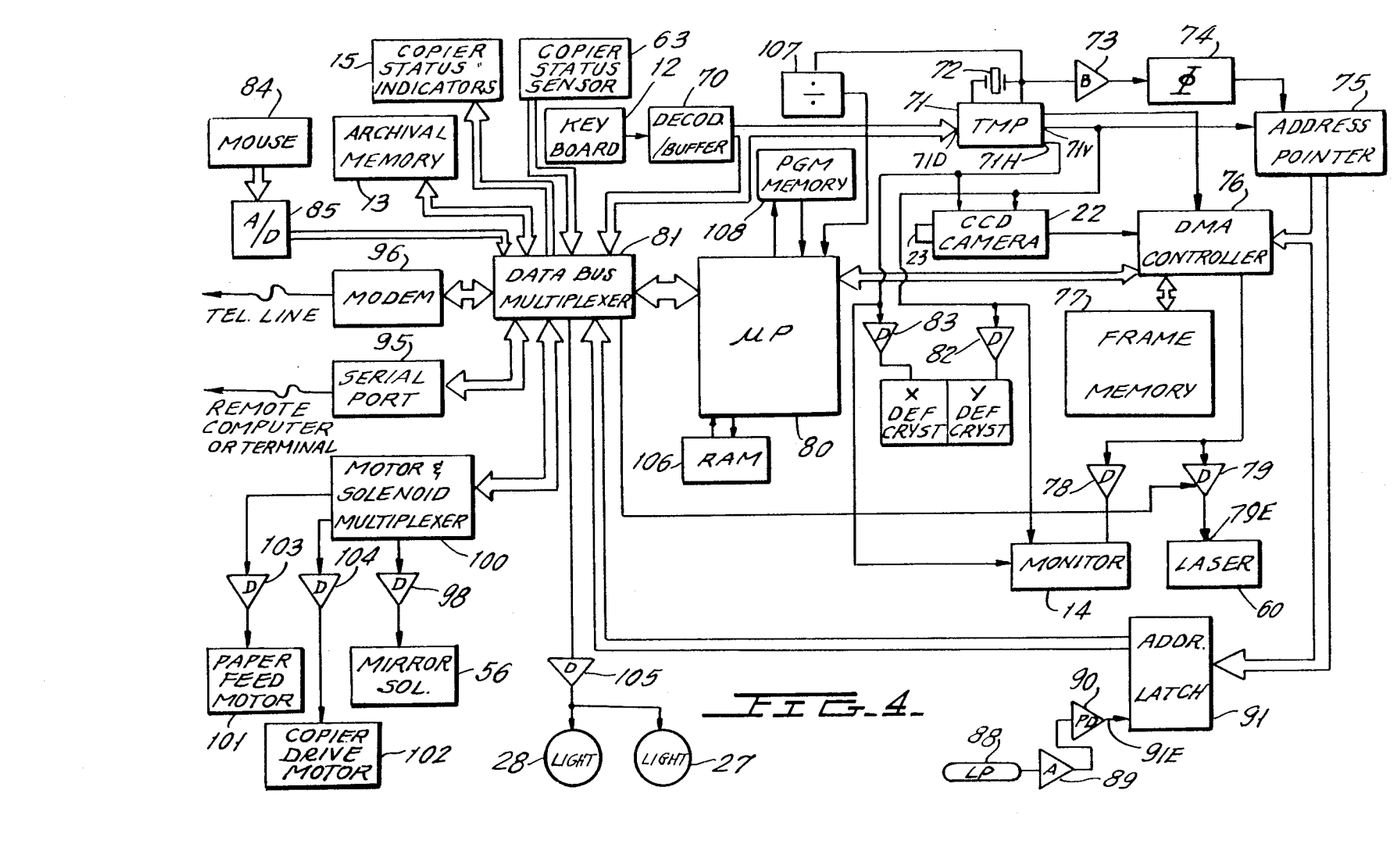
FIG. 4 shows a schematic view of the electrical controls and processing which may be used with this invention.

FIG. 4 schematically illustrates a diagram of the electronic and electro-mechanical components of system 10. In a typical mode of operation, characters defining information to be printed on a sheet fed to the printing apparatus described, may be defined by electrical code signals generated by selectively manually operating selected keys 12K of the keyboard 12. The signals output by the selective operation of keyboard 12 are conducted to a decoder and buffer memory 70, as they are generated, and the output of the buffer 70 is immediately applied to a terminal management processor 71. The processor 71 provides all of the character, video and raster scan signals necessary to display the information to be printed on the display screen of monitor 14. Video information in the form of video frame picture signals, appear at a data connection 71D and are preferably in the form of digital video signals wherein a code defining a digital signal representation of the number "1" defines a white area or pixel on the video screen while a "0" or lack of digital signal represents a black or unenergized area or pixel. An output 71V of the terminal management processor 71 is energized with vertical sync signal video information while a second output 71H thereof contains horizontal sync video information. A crystal 72 defines part of an internal oscillator in the terminal management processor 71 and provides accurate, stable sync signals to properly control the video display of information.

The oscillator signal from the terminal management processor 71 is tapped by a buffer-amplifier 73 and is converted by a phase locked frequency generator 74 having a phase locked loop, to a frequency which is equivalent to the generated video pixel scanning rate for the resolution of the display screen, approximately 10–15 megahertz to provide good quality character resolution. The output of a generator 74 forms the clock input to an address pointer 75, such as a binary counter. The vertical sync signal output by the terminal management processor 71 is used to reset the address pointer at the beginning of each new frame of video information generated, thus insuring stable video signal synchronization.

The output of address point 75 is signals defining a digital representation of the instant or current location of the pixel being scanned and is employed, by means of a direct memory access controller 76, to open or properly condition the appropriate memory location in a frame memory 77 for reproduction therefrom. The "white" or "black" video information required for properly activating the pixel being scanned under the control the terminal management processor 71, is transferred to the open or recording location in the memory 77 through the direct memory access controller 76. The contents of the currently open storage location of memory 77 are also simultaneously output by the direct memory access controller 76 to a video driver 78 and are conducted therefrom to the monitor 14 in a manner to display such information on the display screen thereof for viewing by the operator. The signal output from the direct memory access controller 76 is also output to a driver 79 for laser 60 so as to provide suitable modulation of the beam output by the laser whenever the driver 79 is enabled by a true signal applied to the driver enabling input 79E, as generated by a microprocessor or computer through a data bus multiplexer 81.

Scanning synchronization for monitor 14 to provide proper image generation on its display screen, is derived directly from outputs 71H and 71V of the terminal monitor processor 71. Deflection control signals for the Y-directional positioning of the beam of the laser 60 against a select portion of the field defining area of the xerographic belt 30 is effected by the signals output by a vertical ramp generator and driver 82 applied to a Y-deflection control crystal 62B. Y-directional synchronization is provided on the output 71V of the terminal management processor 71, which generates a synchronizing signal which acts as a trigger for the ramp generator 82. X-direction positioning control of the beam of the laser 60 is effected by the signal output by the horizontal ramp generator and driver 83 applied to x-deflection control crystal 62A. X-direction synchronization is provided by the signal output on 71H of terminal management processor 71, which signal triggers the operation of a ramp generator 83.

Graphics data may be directly recorded in frame memory 77 as output from microprocessor 80 to the direct memory access controller 76. Such data may be generated by a number of means including a manually operated mouse-type of controller 84 which may be hand directed along a surface of the table or bench supporting the housing 11 or a tablet. The analog position defining signal generated on the output of a mouse 84 is converted to digital form by an analog-to-digital converter 85 and is conducted to a data bus multiplexer 81 resulting in the provision of selected information at a microprocessor 80 for processing and application to the frame memory 77 via the direct memory access controller 76.

Another means for generating graphics information is by means of a light pen 88 which is selectively placed by hand against selected areas of the monitor screen 14. Such light pen consists of a photosensor, such as a phototransistor, and an appropriate focusing lens or lens system. The output of the light pen 88 is amplified by an amplifier 89 the output of which is input to a thresholding pulse discriminator 90. Appropriately narrow pulses which are indicative of monitor screen scanning by its write beam, are detected and cause a true enabling signal to be transferred to the write enable input 91E of an address latch 91. When the raster scanning write-beam of monitor 14 intersects the location of the light pen 88, the pixel position represented by the output of pointer 75 is latched by address latch 91 and simultaneously output to microprocessor 80 through multiplexer 81 for further processing.

A third graphics input means is provided in the form of the keyboard 12. To facilitate the recognition of these control sequences, the output of the decoder-buffer 70 is directly available to the microprocessor 80, via multiplexer 81.

When a complete video frame has been properly composed by the operator, as indicated on the display screen of the video monitor 14, such information may be permanently stored in one of the archival memories or discs of the archival memory means 13, by transferring the information stored in the frame memory 77 through the controller 76 and microprocessor 80 to such archival memory, which may comprise a magnetic recording disc, tape or solid state memory forming part of such archival memory.

An additional source of graphics information may comprise prerecorded information generated on the output of one of the memories of one of the devices forming the archival memory 13, and transferred via microprocessor 80 and controller 76 to the frame memory 77. Additional information may also be accessed from a remote computer or terminal via a serial port 95 by means of a hard wire link or other form of information channel. Such information may be accessed, received and transmitted by microprocessor 80 to the multiplexer 81 together with other information formats transmitted thereto from other sources. A modem 96 is provided for the remote access of information from other computer systems and non-related sources, thus providing ASCII or graphics communication standards which have been established.

When a graphics defining frame is properly composed, a hard copy of such frame information may be provided by suitably activating keys of the keyboard 12 in a manner to enable the laser driver 79 and mirror solenoid 56 to be properly operated by signals received from microprocessor 80 and conducted on the multiplexer 81 and a further multiplexer 100 for applying such signals to a motor and solenoid driver 98. Such procedure, which includes the selective operation of character defining code keys of keyboard 12, will effect the selective printing of laser generated characters against the xerographic belt as described, wherein such laser information results from selectively discharging with laser light, selected portions of the belt such as band areas thereof defining lines of alpha-numeric characters. When character information defining one or more characters, lines, groups of lines or paragraphs or pages has been so recorded on the belt, microprocessor 80 operates to control the operation of a paper feed drive motor 101 and copier belt drive motor 102 which are properly driven by signals generated by the microprocessor, applied therefrom to the multiplexer 81 which directs such signals through a second multiplexer 100 to respective motor drivers 103 and 104. Suitable print cycle control is thus affected as previously described.

The status of the operation of the copier may be monitored under the control of a microprocessor 80 which receives signals output by sensors 63 and other sensors (not shown) transmitted by the multiplexor 81 and indicative of such variables as the condition of paper in the paper tray, the supply of toner, one or more paper jams within the machine, etc. Such control functions are common and known in the art. Indications of the status of the copier may thus be provided by selectively activating individual indicators of the bank 15 of such indicators under the control of the microprocessor 80. The microprocessor 80 also operates to activate controls for energizing and deenergizing the illumination lamps 27 and 28 through a lamp driver 105 connected to the multiplexer 81.

Temporary scratch-pad memory for the operations controlled by the microprocessor 80, is affected by means of a random access memory or RAM 106. Timing and synchronization of the operations of the microprocessor 80 is provided by signals generated by the crystal oscillator 72 of the terminal management processor, wherein such signals have been appropriately conditioned by a divider 107. Encoded instructions recorded in a program memory 108 provide sequencing and operation controls. Such memory 108 may be non-volatile as defined by a read-only-memory or ROM or may be down-loaded into a RAM type memory from the archival memory 13 when the system is energized or under the control of the operator.

In the described electronic computing and control system, it is assumed that suitable operational power supplies are provided of proper polarity on the correct sides of all electronic components, subsystems and devices to effect the modes of operation described. It is also noted that the described photoconductor containing endless belt may be replaced by a conventional photoconductor coded, power rotated drum for similarly receiving and transferring image information xerographically to one or more sheets of paper as generated by the selective activation of keys of the keyboard 12, from one or more local memories or computers, from the output of the television camera 22, from one or more local or remote sensors or from one or more remote memories or computers which may automatically transmit information to a receiver and record it in one or more of the archival memories 13A, 13B or 13C under control of the microprocessor 80 through data bus multiplexer 81. Such information may also be accessed by properly activating keys of the keyboard 12 for generating telephone line connection and control signals in an automatic telephone switching and connection system coupled or connected to the microprocessor 80 through a suitable modem, as described, wherein line connection to a remote computer and memory is so effected and access to selected information in its memory bank or output is attained by the operator of the system 10 for generating and effecting the transfer and transmission of such selected data to system 10 and through the microprocessor 80 to the archival memory 13 or one of the additional memories connected to the microprocessor.

In yet another form of the invention, the pivoted cover 17 which is operable to bear against a document disposed on the glass plate 16P across the opening 16 of the housing extension 11B may itself contain or comprise a suitable light emitting video display such as a plasma display, light emitting diode display, cathode ray tube of the like for displaying character and/or graphical information generated by selective operation of the keys of the keyboard 12, from memory, a computer, television camera, disc or tape recorder-reproducing unit, mouse, light pen or other device. The light generated by such cover containing display may be employed to selectively discharge the charged belt 30 or the charged surface of a xerographic drum, if used in place of the belt, to provide desired image information to supplement or be combined with or superimposed on the information generated by the laser as described and/or by light scanning the document placed on the glass plate 16P. If the document is light transmitting, such as a transparency, then the light pattern generated by the flat panel display forming or attached to the cover 17 may simultaneously discharge the belt 30 or drum. If the document is opaque, the cover mounted display may operate to form part of the image to be printed when the document is removed from plate 16P. It is also noted that the described laser beam image forming means may be operated simultaneously as a document on plate 16P is light scanned to form a composite image as described by providing a suitable manually operable switch or computer operated switch and control means in the microcomputer 80 for simultaneously reproducing the selected video information signal from memory snf controlling the described means for effecting light scanning of a document disposed on the plate 16P.

In yet another form, the transparent plate 16P may be replaced by a transparent flat video display, such as a plasma, CCD, LCD or other suitable display through which light from the light scanned document may pass to the mirror 33 for the simultaneous or sequential discharging of the charged belt 30 to provide superimposed informtion thereon and composite images.

Various techniques and systems are known in the art for deflection controlling and intensity modulating light beams such as generated by lasers and the like. Reference is made to U.S. Pat. No. 4,121,249, the references thereof and other U.S. Patents for details of such other techniques employable to properly deflection control and modulate or gate the laser beam employed herein to generated character, graphical and photographic image information and temporarily record same in the charged belt 30 or xerographic drum if employed to replace the belt.

It is also noted that the video image displayed on the display of the video monitor 14 and derived from video signals such as video display signals recorded in the memory or generated by selectively operating the keys of the keyboard, a television camera or other means or combinations of such signal generating means and combined on the display by conventional means, may be manipulated such as by rotating, shifting, enlarging or reducing same prior to utilizing the information defining same to produce the composite hard copy as described. Reference is made to U.S. Pat. No. 4,432,009 for one technique for rotating television images using a prefilter which may be employed to vary the video information displayed before it is recorded as hard copy as described. Other known means may also be employed to selectively change or vary the image or images which are used to effect such composite hard copy either before the composite image is generated or thereafter.

We claim:

1. Apparatus for printing hard copy comprising:
   (a) first means including xerographic image receiving means having an endless surface for retaining an electrostatic charge capable of being selectively discharged upon exposure to light,
   (b) power operated means for driving said endless surface receiving means, and means for uniformly charging same,
   (c) second means for selectively applying particulate printing material to the electrostatically charged surface of said image receiving means in accordance with the charge pattern thereof,
   (d) third means for transferring particles of said printing material disposed on said endless surface in the pattern in which they are disposed to the surface of a record means,
   (e) fourth means for fusing and bonding said particles in the pattern they are applied to the surface of said record means, the improvement comprising:
   (f) fifth and sixth means for respectively applying respective light patterns to said endless surface of said xerographic image receiving means for selectively discharging respective portions of the charge in said endless surface,
   (g) said fifth means including means for supporting a printed document, means for scanning said document with light and directing reflections of said light against said charged endless surface to selectively discharge same,
   (h) said sixth means including a laser, means for deflection controlling and intensity modulating the beam of said laser,
   (i) seventh means for generating video electrical signals and applying said electrical signals to control said laser to cause its beam to selectively scan said endless surface of said image receiving means so as to selectively discharge the charge pattern therein in accordance with the information defined by said video signals,
   (j) a supply of record members and means for feeding individual record members therefrom into operative relation with respect to said endless surface image receiving means containing particles of said printing material selectively disposed thereon in accordance with the charge pattern defined by the controlled operation of said fifth and sixth means, and
   (k) master control means for controlling the operation of said power operated means for said first means, said fifth means and said seventh means to control said laser to cause it to predeterminately and synchronously discharge the electrostatic charge on said endless surface of said xerographic image receiving means and to provide a charge pattern therein forming a select composite image on the surface of a record member operatively fed with respect to said image receiving means.

2. A printing apparatus in accordance with claim 1 wherein said endless surface image receiving means includes an endless flexible belt and means for guiding said belt as it is driven in a predetermined path.

3. A printing apparatus in accordance with claim 1 including a video terminal having an image generating display and a keyboard having keys for generating code signals defining selected alphanumeric characters, a memory for receiving and storing said code signals, means for reading said memory and applying said code signals to control said display to display the characters defined by said signals and for controlling the operation of said sixth means to cause said laser to selectively discharge said xerographic image receiving means in accordance with the pattern of light directed from said laser to the charged surface of said xerographic image receiving means.

4. A printing apparatus in accordance with claim 3 including means for sequentially operating said fifth and sixth means to predeterminately discharge the electrostatic charge in said endless surface.

5. A printing apparatus in accordance with claim 3 including means for simultaneously operating said fifth and sixth means to predeterminately discharge the electrostatic charge in said endless surface.

6. A printing apparatus in accordance with claim 3 including a common housing for supporting said first to said sixth means and said video terminal.

7. A printing apparatus in accordance with claim 3 wherein said video terminal is supported within its own housing and an additional housing supporting said first to said sixth means.

8. A printing apparatus in accordance with claim 3 including a television camera operable to scan a document to be copied and generate a full frame video signal of said document, means for recording video signals output by said television camera, means for applying signal information output of said television camera to control said video terminal display to display the image of the document scanned by said camera.

9. A printing apparatus in accordance with claim 8 including means for applying the full frame video signal generated by said television camera in scanning a document to selectively discharge the charge in said xerographic image receiving means to permit said image receiving means to effect the printing of image information on the surface of the document scanned by said television camera.

10. A printing apparatus in accordance with claim 9 including means for utilizing said full frame video signal to control the operation of said sixth means to cause said laser to scan and selectively discharge said charge in said xerographic image receiving means with the image information scanned by said television camera.

11. A printing apparatus in accordance with claim 3 including a memory containing a plurality of video signals recorded therein, means for selectively reproducing selected of said video signals from said memory, buffer recording means for receiving selected video signals reproduced from said memory and recording same, and means for reproducing same to cause said video terminal display means to display an image defined by signals selectively reproduced from said memory and means for generating and applying signals defining the video information displayed to said sixth means to cause said laser to temporarily record said video information in said image transfer means by selectively discharging the charge in said endless surface.

12. An apparatus in accordance with claim 1 including a video terminal having an image generating video display, a keyboard operable to effect the generation of graphical and character data on said display, a digital computer defining said master control means and means for controlling the generator of visual data on said video display, said keyboard including manually operated means for controlling the operation of said computer to both display selected information and effect the printing of said selected information.

13. An apparatus in accordance with claim 11 including means for receiving and recording data in said memory which is generated at a remote location, means for selectively reproducing said data received and recorded in said memory and applying same to cause said video display to display the data to said sixth means for causing said laser to temporarily record said information in said image transfer means by selectively discharging the charge on said endless surface.

14. Apparatus for printing hard copy of documents comprising:
(a) first means, including xerographic image receiving means, for retaining an electrostatic charge capable of being selectively discharged upon exposure to light,
(b) power operated means for driving said image receiving means in a fixed path and means for uniformly charging same,
(c) second means for selectively applying particulate printing material to the charged surface of said image receiving means in accordance with the charge pattern thereof,
(d) third means for transferring particles of said printing material disposed on said charged surface in the pattern in which they are disposed, to the surface of a print receiving means,
(e) fourth means for fusing and bonding the particles transferred to said surface of said print receiving means in the pattern they are applied to said surface,
(f) fifth and sixth means for selectively applying respective light patterns to said surface of said print receiving means for selectively discharging respective portions of the charge on the charged surface of said image receiving means,
(g) said fifth means including means for supporting a document, means for scanning said document with light and directing reflections of such light against the charged surface of said receiving means to selectively discharge same,
(h) said sixth means including a laser, means for deflection controlling and modulating the beam of said laser to cause said laser beam to intersect a select portion of the surface of said image receiving means for selectively discharging same,
(i) a mirror means disposed between said fifth means, said sixth means and said xerographic image receiving means for directing light from either said fifth means or said sixth means to the surface of said image receiving means,
(j) means for selectively moving said mirror between at least two positions, at one of which positions said mirror operates to receive and reflect light from a document supported by said fifth means and wherein, when said mirror is moved to another of such positions, light may be passed from said laser without intersecting said mirror, and
(k) means for transferring particles from said first means to a print receiving surface.

15. An apparatus in accordance with claim 14 including means for rotatably supporting said mirror, and power operated means for driving said mirror between said two positions, further including control means for controlling said power operated means to drive said mirror to a position for receiving and reflecting light from a document to said image receiving means when a document supported by said fifth means is scanned with light, said control means being operable to control said power operated means to drive said mirror to permit light from said mirror to pass to said xerographic image receiving means when said sixth means operates and the laser thereof generates output light for selectively discharging the electrostatic charge of said first means.

16. Apparatus for printing hard copy comprising:
(a) first means including xerographic image receiving means having an endless surface for retaining an electrostatic charge capable of being selectively discharged upon exposure to light, (b) power operated means for driving said endless surface image transfer means, and means for uniformly charging same, (c) second means for selectively applying particulate printing material to the electrostatically charged surface of said image transfer means in accordance with the charge pattern thereof, (d) third means for transferring particles of said printing material disposed on said endless surface in the pattern in which they are disposed to the surface of a print receiving means, (e) fourth means for fusing and bonding said particles in the pattern they are applied to said print receiving means to the surface of said print receiving means, (f) fifth and sixth means for respectively applying respective light patterns to said endless surface of said xerographic image receiving means for selectively discharging respective portions of the charge in said endless surface in accordance with the characteristics of said charge patterns, (g) said fifth means including means for supporting a printed document, means for scanning said document with light and directing reflections of said light against said charged endless surface to selectively discharge same, (h) said sixth means including a laser, means for deflection controlling and intensity modulating the beam of said laser, (i) a video camera including for generating video electrical signals and applying said electrical signals to control said laser to cause its beam to selectively scan said endless surface of said image receiving means so as to selectively discharge the charge pattern therein in accordance with the information defined by said video signals, (j) a supply of record members and means for driving individual record members therefrom into operative relation with respect to said endless surface image receiving means containing particles of said printing material selectively disposed thereon in accordance with the charge pattern defined by the controlled operation of said fifth and sixth means, (k) a video display terminal including a visual video display and including operator controlled means for generating signals defining select alpha-numeric character defining codes and a memory operative to receive video signals output by said video camera and generated by said operator controlled means and to apply signals recorded therein to generate select image information of the display screen of said display terminal, and (m) means for controllably reproducing signals from said memory to said sixth means to control said laser to selectively generate select image recordings in said image receiving means to permit images to be printed which are derived from signals selectively reproduced from said memory and selective operation of said operator controlled means.

17. Apparatus for printing hard copy of documents comprising:

(a) first means including xerographic image receiving means for retaining an electrostatic charge capable of being selectively discharged upon exposure to light, (b) power operated means for driving said image receiving means in a fixed path and means for uniformly charging same, (c) second means for selectively applying particulate printing material to the charged surface of said image receiving means in accordance with the charge pattern thereof, (d) third means for transferring particles of said printing material disposed on said charged surface in the pattern in which they are disposed, to the surface of a print receiving means, (e) fourth means for fusing and bonding the particles transferred to said surface of said print receiving means in the pattern they are applied to said surface, (f) fifth and sixth means for selectively applying respective light patterns to said surface of said print receiving means for selectively discharging respective portions of the charge applied to the charged surface of said image receiving means, (g) said fifth means including means for supporting a document, means for scanning said document with light and directing reflections of such light against the charged surface of said receiving means to selectively discharge same, (h) said sixth means including a laser, means for deflection controlling and modulating the beam of said laser to cause said laser beam to intersect a select portion of the surface of said image receiving means for selectively discharging same, (i) a video display terminal including means for selectively displaying document information, (j) means for selectively generating video signals and applying said video signals to control said video terminal to display selected visual information for monitoring such visual information, (k) control means operable by a person viewing said video display terminal, (l) memory means including an electronic memory containing document information signals recorded therein, and a video buffer, (m) a video display terminal including a visual video display screen, connected to receive signals from said video buffer, (n) a keyboard operable for generating code signals defining select alpha-numeric characters and connected to record select code signals in said memory means, (o) means for selectively reproducing signals from said memory means and applying same to said video buffer together with character signals generated by selectively operating the keys of said keyboard so as to permit a person operating said video terminal to generate and monitor composite images on said video display screen, (p) means for applying signals reproduced from said video buffer to control the operation of said laser to cause said laser to selectively discharge the charge in said xerographic image receiving means, whereby image charge patterns may be generated in said xerographic image receiving means which are derived from the document information recorded in said memory means, the keyboard generated code signals or a document supported by said fifth means.

* * * * *